(12) United States Patent
Matsumoto et al.

(10) Patent No.: US 8,136,404 B2
(45) Date of Patent: Mar. 20, 2012

(54) OBSTACLE DETECTION SYSTEM

(75) Inventors: Muneaki Matsumoto, Okazaki (JP); Taketo Harada, Obu (JP); Norifumi Matsukawa, Kariya (JP)

(73) Assignee: Denso Corporation, Kariya (JP)

( * ) Notice: Subject to any disclaimer, the term of this patent is extended or adjusted under 35 U.S.C. 154(b) by 419 days.

(21) Appl. No.: 12/561,585

(22) Filed: Sep. 17, 2009

(65) Prior Publication Data
US 2010/0071471 A1 Mar. 25, 2010

(30) Foreign Application Priority Data
Sep. 19, 2008 (JP) ................................ 2008-241365

(51) Int. Cl.
*G01N 29/00* (2006.01)
*B60Q 1/00* (2006.01)
*B60K 28/10* (2006.01)

(52) U.S. Cl. .............. 73/627; 73/596; 73/628; 340/436; 180/274

(58) Field of Classification Search ................... 73/627, 73/628, 596; 340/435, 436; 180/274
See application file for complete search history.

(56) References Cited

U.S. PATENT DOCUMENTS

| | | | | |
|---|---|---|---|---|
| 4,954,962 A * | 9/1990 | Evans et al. | ...................... | 701/28 |
| 5,528,217 A * | 6/1996 | Adams | .......................... | 340/435 |
| 6,285,778 B1 * | 9/2001 | Nakajima et al. | ............. | 382/104 |
| 6,539,294 B1 * | 3/2003 | Kageyama | ...................... | 701/23 |
| 7,202,776 B2 * | 4/2007 | Breed | ............................ | 340/435 |
| 7,528,703 B2 * | 5/2009 | Touge | ............................ | 340/435 |
| 7,620,518 B2 * | 11/2009 | Schmid | ......................... | 702/158 |
| 7,834,746 B2 * | 11/2010 | Suzuki et al. | ................ | 340/435 |
| 7,958,962 B2 * | 6/2011 | Dukart et al. | ................. | 180/274 |
| 2009/0210157 A1 | 8/2009 | Lee | | |

FOREIGN PATENT DOCUMENTS

| | | |
|---|---|---|
| JP | 8-201514 | 8/1996 |
| JP | 9-150710 | 6/1997 |
| JP | 2003-270345 | 9/2003 |

OTHER PUBLICATIONS

Chinese Office Action dated Aug. 1, 2011, issued in corresponding Chinese Application No. 200910173874.6, with English translation.

* cited by examiner

*Primary Examiner* — J M Saint Surin
(74) *Attorney, Agent, or Firm* — Nixon & Vanderhye PC

(57) ABSTRACT

An obstacle detection apparatus for detecting an obstacle in its surroundings is disclosed. The system includes: an ultrasonic sensor for transmitting and receiving ultrasonic wave; an obstacle detection section for performing an obstacle detection operation to determine whether the obstacle actually exists, wherein the obstacle detection section determines that the obstacle actually exists when a first voltage level associated with the ultrasonic wave received in the obstacle detection operation exceeds a determination threshold; a noise monitoring section configured to perform a noise monitoring operation to determine a noise level, wherein, the noise monitoring section recognizes a second voltage level associated with the ultrasonic wave received in the noise monitoring operation as the noise level; and a determination threshold setting section configured to set the determination threshold based on the second voltage level.

8 Claims, 3 Drawing Sheets

OBSTACLE DETECTION SYSTEM

CROSS REFERENCE TO RELATED APPLICATION

The present application is based on Japanese Patent Application No. 2008-241365 filed on Sep. 19, 2008, disclosure of which is incorporated herein by reference.

BACKGROUND OF THE INVENTION

1. Field of the Invention

The present invention relates to an obstacle detection system for detecting an obstacle in the surroundings of the system by utilizing ultrasonic wave.

2. Description of Related Art

An obstacle detection system that detects an obstacle in the surroundings of the system by utilizing ultrasonic wave is described in, for example, JP-2003-270345A. The obstacle detection system disclosed in JP-2003-270345A can operate in a noise determination mode and an obstacle detection mode. In the noise determination mode, the obstacle detection system receives ultrasonic wave from the surroundings while not transmitting ultrasonic wave toward the surroundings from an ultrasonic sensor, recognizes the received ultrasonic wave as noise, and determines whether a voltage level of the noise is greater than or equal to a noise determination value. In the obstacle detection mode, the obstacle detection system transmits ultrasonic wave toward the surroundings from an ultrasonic sensor, receives the ultrasonic wave possibly reflected from an obstacle, and determines that the obstacle actually exists in the surrounding when a voltage level of the reflected ultrasonic wave exceeds an obstacle determination threshold. When it is determined in the noise determination mode that the voltage level of the noise is greater than or equal to the noise determination value, the obstacle detection system prohibits the operation mode from switching into the obstacle detection mode to prevent the obstacle detection operation from being performed, because there is a possibility that the noise prevents the system from detecting an obstacle with high accuracy.

According to the above described conventional technique, however, when it is determined that the voltage level of the noise is greater than or equal to the noise determination value, the operation mode is prohibited from switching into the obstacle detection mode without exception. When it is determined that the voltage level of the noise is less than the noise determination value, the operation mode is switched into the obstacle detection mode without exception.

Accordingly, when the voltage level of the noise is greater than or equal to the noise determination value, the conventional technique cannot perform the obstacle detection operation even if a situation allows obstacle detection. Such a situation is, for example, that the obstacle is located close to the system and the voltage level of the reflected ultrasonic wave is sufficiently large.

SUMMARY OF THE INVENTION

In view of the above and other points, it is an objective of the present disclosure to provide an obstacle detection system that is capable of detecting an obstacle even in a high level noise environment while suppressing a decrease in accuracy of obstacle detection.

According to an aspect of the present disclosure, there is provided obstacle detection system for detecting an obstacle in surroundings of the subject obstacle detection system by utilizing ultrasonic wave. The obstacle detection system includes: an ultrasonic wave transmission section configured to transmit the ultrasonic wave toward the surroundings; an ultrasonic wave reception section configured to receive the ultrasonic wave from the surroundings; and an obstacle detection section configured to perform an obstacle detection operation to determine whether the obstacle actually exists. In the obstacle detection operation, the ultrasonic wave transmission section transmits the ultrasonic wave toward the surroundings and the ultrasonic wave reception section receives the ultrasonic wave reflected from the obstacle. The obstacle detection section determines that the obstacle actually exists when the obstacle detection section determines that a first voltage level exceeds a determination threshold. The first voltage level is associated with the ultrasonic wave received in the obstacle detection operation. The obstacle detection system further includes a noise monitoring section configured to perform a noise monitoring operation to determine a noise level. In the noise monitoring operation, the ultrasonic wave reception section receives the ultrasonic wave from the surroundings while the ultrasonic wave transmission section does not transmit the ultrasonic wave toward the surroundings. The noise monitoring section recognizes a second voltage level as the noise level, the second voltage level being associated with the ultrasonic wave received in the noise monitoring operation. The obstacle detection system further includes a determination threshold setting section configured to set the determination threshold based on the second voltage level.

According to the above obstacle detection system, the noise monitoring section determines the noise level by detecting the second voltage level associated with the ultrasonic wave received in the noise monitoring operation, and the determination threshold setting section sets the determination threshold based on the noise level determined by the noise monitoring section. When the first voltage level associated with the ultrasonic wave reflected from the obstacle is determined to exceed the determination threshold, the obstacle determination section determines that the obstacle actually exists in the surroundings. Since the determination threshold is set based on the noise level in the above-described manners, it becomes possible to perform the obstacle detection operation in a high noise situation while a decrease in obstacle detection accuracy is being suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Figure 1:
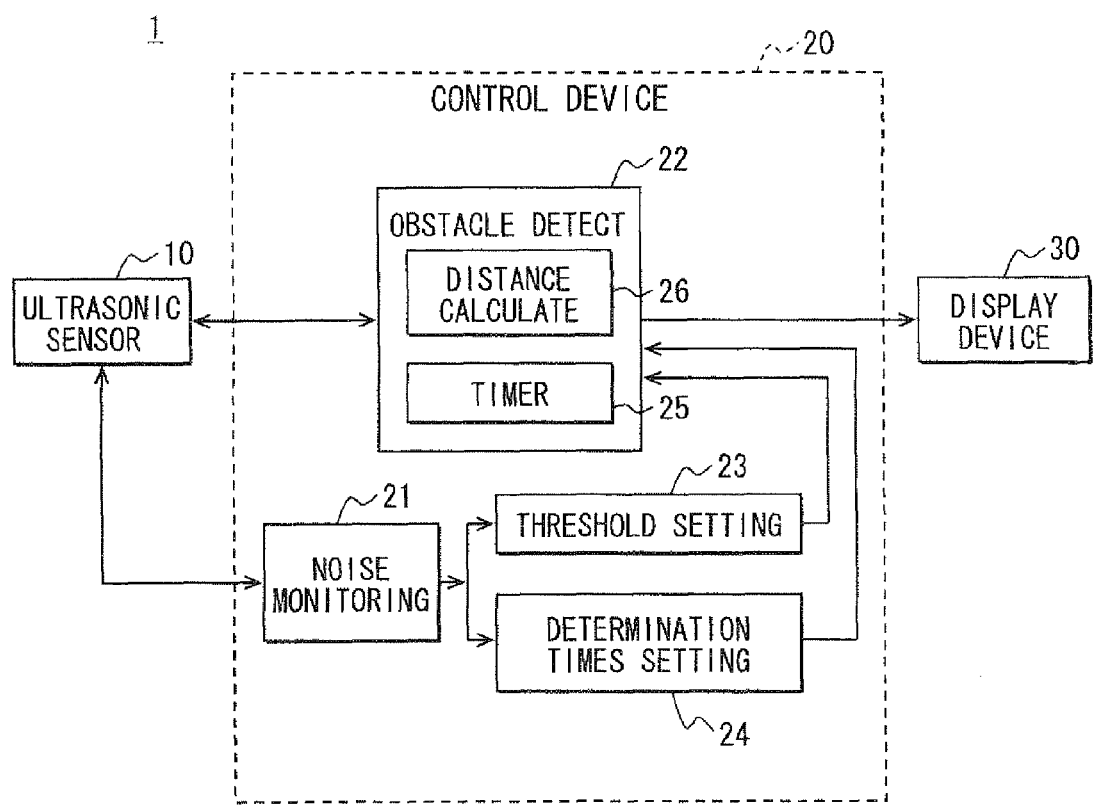
FIG. 1 is a block diagram illustrating an obstacle detection system according to one embodiment.

The exemplary embodiments are described below with reference to the accompanying drawings. FIG. 1 is a block diagram illustrating an obstacle detection system 1 according to one embodiment.

As shown in FIG. 1, the obstacle detection system 1 includes an ultrasonic sensor 10, a control device 20, and a display device 30. The obstacle detection system 1 is mounted to a vehicle (not shown) to detect an obstacle in the surroundings of the vehicle by utilizing ultrasonic wave.

The ultrasonic sensor 10 may be multiple ultrasonic sensors. For example, multiple ultrasonic sensors (e.g., four ultrasonic sensors) may be mounted to each of a front bumper and a rear bumper of the vehicle. The ultrasonic sensor 10 includes a microphone (not shown) for transmitting ultrasonic wave toward the surroundings and receiving ultrasonic wave from the surroundings. The ultrasonic sensor 10 further includes a circuit (not shown) for amplification, reverberation adjustment, sensitivity adjustment or the like. The ultrasonic sensor 10 is connected with the control device 20. In response to a command signal from the control device 20, the ultrasonic sensor 10 transmits ultrasonic wave with a predetermined frequency or receives ultrasonic wave from the surrounding of the vehicle. The ultrasonic sensor 10 can acts as an ultrasonic wave transmission section for transmitting ultrasonic wave and an ultrasonic wave reception section for receiving ultrasonic wave.

The display device 30 is placed in, for example, a vehicle compartment. The display device 30 is connected with the control device 20, more specifically, connected with an obstacle detection section 22 of the control device 20. When the obstacle detection section 22 calculates a distance to an obstacle existing in the surroundings of the vehicle, the display device 30 displays a text, an image, a video or the like to provide a result of the calculated distance. Further, based on the result of the calculated distance, a predetermined warning may be outputted from a notification device (not shown), which is a buzzer for instance.

The control device 20 may include a computer having a CPU, a memory and the like (not shown), and performs various procedures based on programs stored in a memory. As shown in FIG. 1, the control device 20 includes a noise monitoring section 21 for noise monitoring, an obstacle detection section 22 for obstacle detection, a determination threshold setting section 23 for setting a determination threshold "Th", and a determination times setting section 24 for setting the number of determination times. The obstacle detection section 22 includes a timer portion 25 and a distance calculation portion 26, which are related to calculation of a distance to an obstacle in the surroundings of the vehicle.

The noise monitoring section 21 is connected with the ultrasonic sensor 10. The noise monitoring section 21 issues and outputs a noise monitoring command to the ultrasonic sensor 10. When receiving the noise monitoring command, the ultrasonic sensor 10 performs a noise monitoring operation by receiving ultrasonic wave from the soundings while not transmitting ultrasonic wave toward the surroundings, and processes a signal associated with the received ultrasonic wave, and outputs a processed signal to the noise monitoring section 21. The noise monitoring section 21 receives the processed signal from the ultrasonic sensor. The noise monitoring section 21 recognizes the received signal as noise. The noise monitoring section 21 determines a voltage level (noise level) of the noise. Hereinafter, the voltage level of the noise may be also referred to as a noise level or a second voltage level. The noise monitoring section 21 is connected with the determination threshold setting section 23 and the determination times setting section 24, and outputs a result of the determination of the noise level to the determination threshold setting section 23 and the determination times setting section 24.

The obstacle detection section 22 is connected with the ultrasonic sensor 10. The obstacle detection section 22 issues and outputs an obstacle detection command to the ultrasonic sensor 10. When receiving the obstacle detection command, the ultrasonic sensor 10 performs an obstacle detection operation by transmitting ultrasonic wave with a predetermined frequency toward the surroundings, and receives the ultrasonic wave reflected from an obstacle in the surroundings. The ultrasonic sensor 10 process a signal associated with the received ultrasonic wave, and outputs the processed signal to the obstacle detection section 22. The obstacle detection section 22 receives the processed signal from the ultrasonic sensor 10, and determines whether a voltage level of the signal exceeds a determination threshold "Th". Hereinafter, the voltage of the signal associated with the reflected ultrasonic wave may be also referred to as a reflected wave level or a first voltage level. The obstacle detection section 22 is connected with the determination threshold setting section 23, and determines the reflected wave level by using the determination threshold "Th", a value of which has been set by the determination threshold setting section 23.

The obstacle detection section 22 includes the timer portion 25 and the distance calculation portion 26. The timer portion 25 measures a period elapsing from a time when the ultrasonic sensor 10 transmits the ultrasonic wave toward the surroundings to a time when the ultrasonic sensor 10 receives the ultrasonic wave possibly reflected from an obstacle in the surroundings. The timer portion 25 may be provided as, for example, a known timer circuit. When the obstacle detection section 22 determines that the reflected wave level exceeds the determination threshold "Th", the distance calculation portion 26 calculates a distance to the obstacle in the surroundings by using a speed of ultrasonic wave and the period measured by the timer portion 25. A calculation result of the distance is stored in a memory (not shown) each time the distance is calculated. At ordinary temperatures, the speed of ultrasonic wave is approximately 340 m/s.

The obstacle detection section 22 cyclically performs the obstacle detection operation and determines the reflected wave level every a predetermine period of time. When the obstacle detection operations are performed multiple times and when the obstacle detection section 22 determines that the number of successive times the reflected wave level exceeds the determination threshold "Th" is greater than the reference number of times "N" in the multiple obstacle detection operations, the obstacle detection section 22 determines that the obstacle actually exists in the surroundings. When the obstacle detection section 22 determines that the number of successive times the reflected wave level exceeds the determination threshold "Th" is less than or equal to the reference number of times "N" in the obstacle detection operations, the obstacle detection section 22 determines that the obstacle does not actually exist in the surroundings. The obstacle detection section 22 is connected with the determination times setting section 24, and compares the number of successive times to the reference number of times. The reference number of times is set by the determination times setting section 24.

The obstacle detection section 22 is connected with the display device 30. When the obstacle detection section 22 determines that the obstacle actually exists in the surroundings, the obstacle detection section 22 outputs the distance to the obstacle calculated by the distance calculation portion 26 to the display device 30, and causes the display device 30 to display the information on the calculated distance. Although the distance calculation portion 26 cyclically calculates the distance to an obstacle every the predetermined period of time, the obstacle detection section 22 outputs the calculated distance to the display device 30 to cause the display device 30 to display the information on the calculated distance only when it is determined that the number of successive times is greater than the reference number of times.

The determination threshold setting section 23 sets the determination threshold "Th" for use in the obstacle detection section 22, based on the noise level determined by the noise monitoring section 21. More specifically, in the present embodiment, the determination threshold setting section 23 sets the determination threshold "Th" to a value that is larger than the noise level by a predetermined value of, for example, 100 mV. Since the determination threshold "Th" is set to a value larger than the noise level by the predetermined value, it becomes possible to use the larger determination threshold "Th" as the noise level becomes larger, and it becomes possible to use the smaller determination threshold "Th" as the noise level becomes smaller. It should be noted that, although the predetermined value of 100 mV is exemplified in the above, the predetermined value is not limited to the above example and may have any value.

The determination times setting section 24 sets the reference number of times "N" for use in the obstacle detection section 22, based on the noise level determined by the noise monitoring section 21. More specifically, in the present embodiment, when the noise level is less than or equal to a first threshold "th1", the reference number of times "N" is set to "one time", i.e., N=1. The first threshold "th1" is, for example, 50 mV. When the noise level is larger than the first threshold "th1" and less than or equal to a second threshold "th2", the reference number of times "N" is set to "two times", i.e., N=2. The second threshold "th2" is, for example, 100 mV. When the noise level is larger than the second threshold "th2", the reference number of times "N" is set to "three times", i.e., N=3. According to the above manner, it becomes possible to use the larger reference number of times "N" as the noise level is smaller, and it becomes possible to use the larger reference number of times "N" as the noise level is larger. It should be noted that the first and second thresholds "th1" and "th2" are not limited the above exemplified values, and may be changed. The reference number of times "N" corresponding to the first threshold "th1" or the second threshold "th2" are not limited to the above exemplified values, and may be changed.

Figure 2:
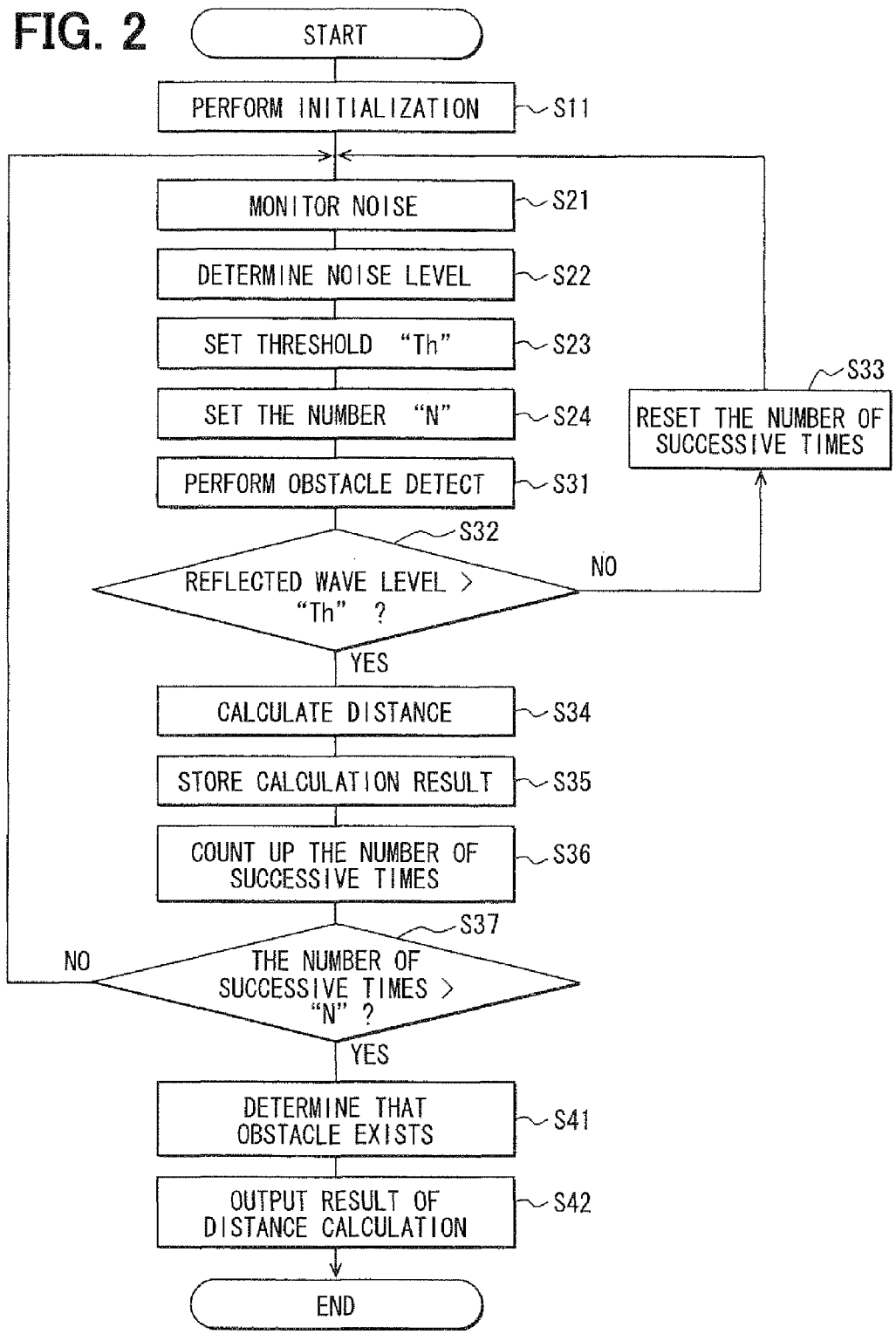
FIG. 2 is a flowchart illustrating an obstacle detection procedure according to one embodiment.

Operation of the obstacle detection system 1 is described below with reference to FIG. 2. FIG. 2 is a flowchart illustrating an obstacle detection procedure S1 to be performed by the obstacle detection system 1.

When the obstacle detection procedure S1 is started, the control device 20 performs an initialization operation at S11. In the initialization operation, the control device 20 sets the determination threshold "Th", which is to be changed by the determination threshold setting section 23, to a predetermined initial value (e.g., Th=0.20 V). Further, the control device 20 sets the reference number of times "N", which is to be changed by the determination times setting section 24, to a predetermined initial value (e.g., two times N=2).

After performing the initialization operation, the process proceeds to S21 and S22. At S21, the control device 20 (more specifically the noise monitoring section 21) causes the noise monitoring operation to be performed. At S22, the control device (more specifically the noise monitoring section 21) determines the noise level and stores the determined noise level in the memory. More specifically, the noise monitoring section 21 issues and outputs the noise monitoring command to the ultrasonic sensor 10, so that the ultrasonic sensor 10 receives ultrasonic wave from the surroundings while not transmitting ultrasonic wave toward the surroundings. The ultrasonic sensor 10 processes a signal associated with the received ultrasonic wave, and outputs the processed signal indicative of the noise to the noise monitoring section 21. The noise monitoring section 21 determines a voltage level of the noise based on the signal from the ultrasonic sensor 10. The noise monitoring section 21 stores the determined noise level in the memory.

After storing the noise level in the memory, the control device 20 (more specifically the determination threshold setting section 23) sets at S23 the determination threshold "Th" based on the noise level stored in the memory. More specifically, the determination threshold setting section 23 sets the determination threshold "Th", which is for use in the obstacle detection section 22, to a value that is larger than the noise level by the predetermined value of, for example, 100 mV.

At S24, the control device 20 (more specifically the determination times setting section 24) sets the reference number of times "N" based on the noise level stored in the memory. For example, when the noise level is less than or equal to the first threshold "th1", the reference number of times "N" is set to one time, i.e., N=1. When the noise level is greater than the first threshold "th1" and less than or equal to the second threshold "th2", the reference number of times "N" is set to two times, i.e., N=2. When the noise level is greater than the second threshold "th2", the reference number of times "N" is set to three times, i.e., N=3.

After setting the determination threshold "Th" and the reference number of times "N", the process proceeds to S31 and S32. At S31 and S32, the obstacle detection operation is performed and it is determined whether the reflected wave level exceeds the determination threshold "Th". More specifically, the obstacle detection section 22 issues and outputs the obstacle detection command to the ultrasonic sensor 10, thereby causing the ultrasonic sensor 10 to transmit ultrasonic wave having a predetermined frequency toward the surroundings and to receive the ultrasonic wave reflected from an obstacle in the surroundings. The ultrasonic sensor 10 processes a signal associated with the received ultrasonic wave, and outputs the processed signal to the obstacle detection section 22. The obstacle detection section 22 determines a voltage level of the reflected wave based on the signal from the ultrasonic sensor 10.

When it is determined at S32 that the reflected wave level is less than or equal to the determination threshold "Th", corresponding to "NO" at S32, the process proceeds to S33. The determination "NO" at S32 indicates that an obstacle does not actually exist in the surroundings of the vehicle. At S33, the obstacle detection section 22 resets the number of successive times, and then, the process returns to S21 to perform S21 to S24 again.

When it is determined at S32 that the reflected wave level exceeds the determination threshold "Th", corresponding to "YES" at S32, the process proceeds to S34 and S35. The determination "YES" at S32 indicates a possibility that an obstacle actually exists in the surrounding of the vehicle. At S34 and S35, the obstacle detection section 22 (more specifically, the distance calculation portion 26) calculates a distance to the obstacle located in the surroundings by using a speed of ultrasonic wave and the period measured by the timer portion 25. Note that the speed of ultrasonic wave is approximately 340 m/s at ordinary temperatures. The obstacle detection section 22 stores the calculated distance to the object in the memory. At S36, the obstacle detection section 22 counts up the number of successive times the reflected wave level is determined to exceed the determination threshold "Th".

At S37, the control device 20 (more specifically the obstacle detection section 22) determines whether the number of successive times the reflected wave level is determined to exceed the determination threshold "Th" is larger than the reference number of times "N". When it is determined that the number of successive times is less than or equal to the reference number of times "N", corresponding to "NO" at S37, the process reruns to S21, because the determination "NO" at S37 indicate that significant evidence of an actual obstacle existence is lacking although there is a possibility that an obstacle exists in the surroundings of the vehicle.

When it is determined at S37 the number of successive times is larger than the reference number of times "N", corresponding to "YES" at S37, the process proceeds to S41. Since the determination "YES" at S37 indicates a high possibility that an obstacle actually exists in the surroundings of the vehicle, it is determined at S41 that the obstacle actually exists in the surroundings of the vehicle. At S42, the display device 30 displays information on the latest result of the calculation of the distance to the obstacle, which is the latest one of the results stored in the memory. After the display device 30 displays the information on the result of the distance calculation, the obstacle detection procedure is ended or the process returns to S21. In the above description, although the obstacle detection section 22 causes the display device 30 to display the information on the latest result of the distance calculation, the information displayed by the display device 30 is not limited to the information on the latest result of the distance calculation. For example, the display device 30 may display information on any one or ones of the distances that have been calculated during a period of time when it is successively determined that the reflected wave level exceeds the determination threshold "Th".

Figure 3:
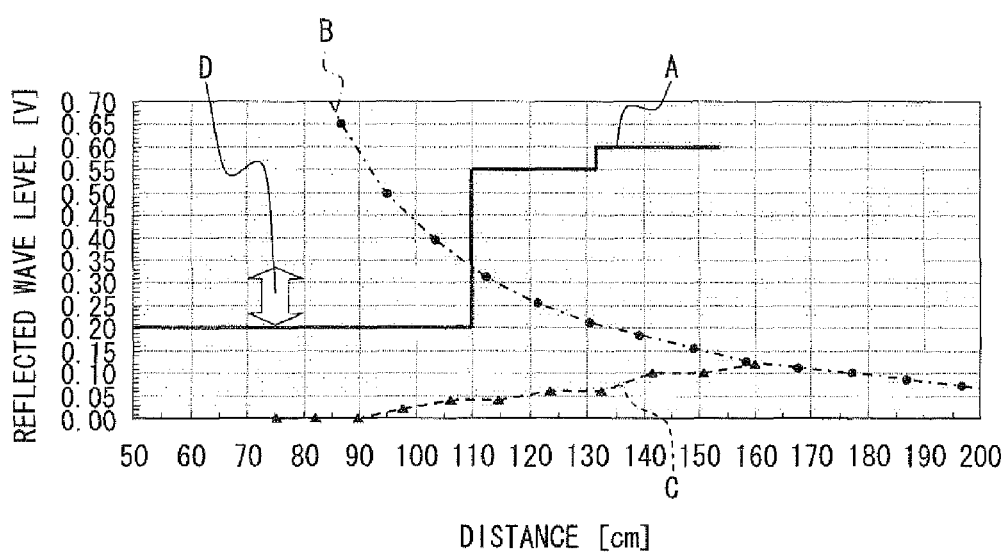
FIG. 3 is a graph illustrating voltage level variations in a low noise environment.

The present embodiments are further explained below with reference to FIG. 3. FIG. 3 illustrates voltage level variations in a situation where surrounding noise level is low. The solid line A in FIG. 3 represents a variation in voltage level of an obstacle determination threshold according to a comparison example. The dashed-dotted line B in FIG. 3 represents a variation in voltage level of the reflected wave that is transmitted from the ultrasonic sensor 10, reflected from a pole and received by the ultrasonic sensor 10. The pole has 60-mm diameter and 1-m high, and acts as an obstacle that is comparable to a pedestrian and the like. The dashed line C in FIG. 3 represents a change in voltage level of the reflected wave that is transmitted from the ultrasonic sensor 10, reflected from a parking block and received by the ultrasonic sensor 10.

As seen from the dashed-dotted line B, the voltage level of the ultrasonic wave reflected from the pole, which is to be detected as an obstacle, becomes smaller as a distance between the ultrasonic sensor and the pole becomes larger and vice versa. As seen from the dashed line C, the voltage level of the ultrasonic wave reflected from the parking block, which is not to be detected as an obstacle, becomes smaller as the distance between the ultrasonic sensor 10 and the parking block becomes smaller and vice versa.

In a case illustrated in FIG. 3, when the distance between the ultrasonic sensor 10 and the pole is 160 cm, the voltage level of the ultrasonic wave reflected from the pole and that from the parking block have the same value of approximately 0.12 V. In such a case, even when the environmental noise level is small, it is impossible to distinguish between the pole, which is to be detected as an obstacle, and the parking block, which is not to be detected as an obstacle. In other words, the reflected wave from the parking block acts as noise that makes the detection of the pole difficult.

When the distance between the ultrasonic sensor 10 and the pole is 110 cm, the voltage level of the ultrasonic wave reflected from the pole is approximately 0.35 V and that from the parking block is approximately 0.05V. In such a case, the voltage levels are remarkably different from each other. Thus, when the environmental noise level is small, it is possible to distinguish between the pole, which is to be detected as an obstacle, and the parking block, which is not to be detected as an obstacle.

As seen from the solid line A in FIG. 3, in the comparison example, a maximum obstacle detection range of an ultrasonic sensor is set to, for example, 110 cm, so that the distinction between the pole and the parking block is possible even when the environmental noise has a certain level. Further, in the comparison example, both of the noise determination value and the obstacle determination threshold are set to a constant value of, e.g., 0.2 V, in the obstacle detection range regardless of the environmental noise level. Regarding the solid line A in FIG. 3, it should be noted that the obstacle determination threshold is also set for a distance larger than 110 cm in order to detect a huge obstacle, which is a wall of a building or the like.

According to the comparison example, as recited in "Description of Related Art", since both of the noise determination value and the obstacle determination threshold are set to the same constant value of, e.g., 0.2 V in the obstacle detection range, when the voltage level of the noise from the surroundings is greater than or equal to the noise determination value, the system cannot switch the operation mode into the obstacle detection mode even if a situation allows obstacle detection. Such a situation is, for example, that the distance to the obstacle such as a pedestrian and the like is 50 cm (see FIG. 3) and the voltage level of the ultrasonic wave reflected from the obstacle is larger than noise.

In view of the above described difficulty of the comparison example, the obstacle detection system 1 (more specifically the determination threshold setting section 23) of the present embodiment increases or decreases the determination threshold "Th" depending on the noise level determined by the noise monitoring section 21, as indicated by the arrow in FIG. 3, so that the determination threshold "Th" is set to a value that is larger than the noise level by, for example, 0.1 V. According to this setting, it becomes possible to use the larger determination threshold "Th" as the noise level becomes larger, and it becomes possible to use the smaller determination threshold "Th" as the noise level becomes smaller. Since the determination threshold "Th" is set based on the noise level, it becomes possible to perform the obstacle detection operation while minimizing the decrease in obstacle detection accuracy even under a situation where the environmental noise is large.

Moreover, in the present embodiment, the obstacle detection system 1 having the determination times setting section 24 sets the reference number of times "N" such that the reference number of times "N" becomes larger as the noise level determined by the noise monitoring section 21 becomes larger, or in other words, the reference number of times "N" becomes smaller as the noise level becomes smaller. Because of the above manner, under large noise level situations, it is possible to improve accuracy of the determination of whether an obstacle actually exists. Under small noise level situations, it is possible to improve response performance of the determination of whether an obstacle actually exists.

The above described embodiments can be modified in various ways, examples of which are described below.

In the above embodiments, when it is determined that an obstacle exists in the surroundings, the obstacle detection system 1 calculates a distance to the obstacle based on (i) a period between the transmission and reception of the ultrasonic wave by ultrasonic sensor 10 and (ii) a speed of the ultrasonic wave, and then, the obstacle detection system 1 displays information on the distance to the obstacle. Alternatively, the obstacle detection system 1 may not include a configuration, such as the timer portion 25 and the distance calculation portion 26, for calculating a distance to an obstacle, and/or, the obstacle detection system 1 may not include a configuration, such as the display device 30, for displaying information on a result of the calculation.

In the above embodiment, the determination times setting section 24 sets the multiple thresholds (e.g., the first threshold "th1" and the second threshold "th2") regarding the voltage level of the noise determined by the noise monitoring section 21. Further, the determination times setting section 24 sets the reference number of times "N", based on the voltage level of the noise relative to the multiple thresholds. However, a way of setting the reference number of times "N" is not limited to the above example. For example, the determination times setting section 24 may set the reference number of times "N" in such a way that the reference number of times "N" is set to a smaller value as a ratio of the determination threshold "Th", which is determined based on the voltage level of noise, to a voltage level of the reflected wave, which is received in the obstacle detection operation, becomes smaller. As long as the reference number of times "N" is set to a smaller value as the voltage level of noise becomes smaller and the "N" is set to a larger value as the voltage level of noise becomes larger, any way of setting the reference number of times "N" can be used. Such setting also can improve accuracy of the determination of whether an obstacle exists under large noise level situations, and can improve response performance of the determination of whether an obstacle exists under small noise level situations. Alternatively, the reference number of times "N" may be fixed to a constant value, e.g., two times regardless of the noise level. In such a case, the determination times setting section 24 can be removed from the obstacle detection system 1.

In the above embodiments, the determination threshold setting section 23 sets the determination threshold "Th" to a value that is larger than the noise level by a predetermined value of, for example, 0.1 V. However, a way of setting the determination threshold "Th" is not limited to the above example. For example, the determination threshold setting section 23 may set the determination threshold "Th" so that a ratio of the noise level, which is determined by the noise monitoring section 21, to the determination threshold "Th", which is to be used in the obstacle detection section 22, becomes a predetermined ratio (e.g., 2). According to the above alternative setting, it becomes possible to use the larger determination threshold "Th" when the noise level becomes larger, and it becomes possible to use the smaller determination threshold "Th" when the noise level becomes smaller. Therefore, it becomes possible to detect an obstacle even under situations where the environmental noise level is large, since the determination threshold "Th" can be set based on the noise level.

In the above embodiments and its modifications, the ultrasonic sensor 10 acts as an ultrasonic transmission section and an ultrasonic reception section. The noise monitoring section 21 of the control device 20 acts as noise monitoring means. The obstacle detection section 22 acts as obstacle detection means. The determination threshold setting section 23 acts as determination threshold setting means. The determination times setting section 24 acts as determination times setting means. The distance calculation portion 26 acts as distance calculation means. The timer portion 25 acts as timer means.

The above embodiments and modifications have the following aspect.

According to a first aspect, there is provided an obstacle detection system for detecting an obstacle in surroundings of the subject obstacle detection system by utilizing ultrasonic wave. The obstacle detection system includes: an ultrasonic wave transmission section configured to transmit the ultrasonic wave toward the surroundings; an ultrasonic wave reception section configured to receive the ultrasonic wave from the surroundings; and an obstacle detection section configured to perform an obstacle detection operation to determine whether the obstacle actually exists. In the obstacle detection operation, the ultrasonic wave transmission section transmits the ultrasonic wave toward the surroundings and the ultrasonic wave reception section receives the ultrasonic wave reflected from the obstacle. The obstacle detection section determines that the obstacle actually exists when the obstacle detection section determines that a first voltage level exceeds a determination threshold. The first voltage level is associated with the ultrasonic wave received in the obstacle detection operation. The obstacle detection system further includes a noise monitoring section configured to perform a noise monitoring operation to determine a noise level. In the noise monitoring operation, the ultrasonic wave reception section receives the ultrasonic wave from the surroundings while the ultrasonic wave transmission section does not transmit the ultrasonic wave toward the surroundings. The noise monitoring section recognizes a second voltage level as the noise level, the second voltage level being associated with the ultrasonic wave received in the noise monitoring operation. The obstacle detection system further includes a determination threshold setting section configured to set the determination threshold based on the second voltage level.

According to the above obstacle detection system, the noise monitoring section determines the noise level by detecting the second voltage level associated with the ultrasonic wave received in the noise monitoring operation, and the determination threshold setting section sets the determination threshold based on the noise level determined by the noise monitoring section. When the first voltage level associated with the ultrasonic wave reflected from the obstacle is determined to exceed the determination threshold, the obstacle determination section determines that the obstacle actually exists in the surroundings. Since the determination threshold is set based on the noise level in the above-described manners, it becomes possible to perform the obstacle detection operation in a high noise situation while a decrease in obstacle detection accuracy is being suppressed.

It becomes typically more difficult to distinguish between the noise and the ultrasonic wave reflected from an obstacle, as the second voltage level or the noise level detected by the noise morning section becomes larger. Therefore, as the noise level becomes lager, the determination threshold setting section may set the determination threshold to a larger value. In others words, it becomes typically easy to distinguish between the noise and the reflected ultrasonic wave, as the second voltage level or the noise level becomes smaller. In view of this, the obstacle detection system may be configured such that the determination threshold setting section sets the determination threshold to a value that is larger than the second voltage level by a predetermined voltage. Alternatively, the obstacle detection system may be configured such that the determination threshold setting section sets the determination threshold so that a ratio of the second voltage level to the determination threshold becomes a predetermined value.

Operation of The obstacle detection system is influenced by noise. Thus, the obstacle detection system may be configured to cyclically perform the obstacle detection operation. When the first voltage level is successively determined to exceed the determination threshold in the obstacle detection operations, the obstacle detection system may make a determination that the obstacle actually exists.

When the second voltage level or the noise level is large, it is typically difficult to distinguish between the noise and the reflected ultrasonic wave. Thus, the obstacle detection system can determine that the obstacle actually exists, after the first voltage level is successively determined to exceed the determination threshold a large number of times. When the second voltage level or the noise level is small, it is typically easy to distinguish between the noise and the reflected ultrasonic wave. Thus, the obstacle system can determine that the obstacle actually exists, when the first voltage level is successively determined to exceed the determination threshold a small number of times. Therefore, the obstacle detection section may be configured such that: the system further includes a determination times setting section configured to set a reference number of times based on the second voltage level; the obstacle detection section cyclically performs the obstacle detection operation; and the obstacle detection section determines that the obstacle actually exists when a number of successive times the first voltage level is determined to exceed the determination threshold is greater than or equal to the reference number of times.

The above described obstacle detection system may be further configured such that: the determination times setting section sets the reference number of times so that the reference number of times becomes larger the second voltage level becomes lager. Alternatively, the determination times setting section sets the reference number of times so that the reference number of times becomes a larger value as a ratio of the second voltage level to the determination threshold becomes smaller. According to the above configuration, when the noise level is large, it becomes possible to improve accuracy of determining whether an obstacle actually exists, because the reference number of times can be set to a large value. When the noise level is small, it becomes possible to improve response performance of determining whether an obstacle actually exists, because the reference number of times can be set to a smaller value.

The above described obstacle detection system may further include: a timer portion configured to measure a period from a time when the ultrasonic wave transmission section transmits the ultrasonic wave toward the surroundings to a time when the ultrasonic wave reception section receives the ultrasonic wave reflected from the obstacle in the surroundings; and a distance calculation portion configured to calculate a distance to the obstacle based on the period and a speed of the ultrasonic wave when the obstacle detection section determines that the obstacle actually exists. According to this configuration, it becomes possible to calculate the distance to the obstacle existing in the surroundings.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. An obstacle detection system for detecting an obstacle in surroundings of the obstacle detection system by utilizing an ultrasonic wave, the obstacle detection system comprising:
    an ultrasonic wave transmission section configured to transmit the ultrasonic wave toward the surroundings;
    an ultrasonic wave reception section configured to receive the ultrasonic wave from the surroundings;
    an obstacle detection section configured to perform an obstacle detection operation to determine whether the obstacle actually exists,
        wherein, in the obstacle detection operation, the ultrasonic wave transmission section transmits the ultrasonic wave toward the surroundings and the ultrasonic wave reception section receives the ultrasonic wave reflected from the obstacle,
        wherein the obstacle detection section determines that the obstacle actually exists when the obstacle detection section determines that a first voltage level exceeds a determination threshold, the first voltage level being associated with the ultrasonic wave received in the obstacle detection operation;
    a noise monitoring section configured to perform a noise monitoring operation to determine a noise level,
        wherein, in the noise monitoring operation, the ultrasonic wave reception section receives the ultrasonic wave from the surroundings while the ultrasonic wave transmission section does not transmit the ultrasonic wave toward the surroundings,
        wherein, the noise monitoring section recognizes a second voltage level as the noise level, the second voltage level being associated with the ultrasonic wave received in the noise monitoring operation; and
    a determination threshold setting section configured to set the determination threshold based on the second voltage level wherein the determination threshold setting section sets the determination threshold to a value that is larger than the second voltage level by a predetermined voltage.

2. The obstacle detection system according to claim 1, wherein:
    the determination threshold setting section sets the determination threshold so that a ratio of the second voltage level to the determination threshold becomes a predetermined value.

3. The obstacle detection system according to claim 2, wherein:
    the obstacle detection section cyclically performs the obstacle detection operation; and
    the obstacle detection section determines that the obstacle actually exists when a number of successive times the first voltage level is determined to exceed the determination threshold is greater than or equal to a reference number of times,
    the obstacle detection system further comprising:
    a determination times setting section configured to set the reference number of times based on the second voltage level.

4. The obstacle detection system according to claim 1, wherein:
- the obstacle detection section cyclically performs the obstacle detection operation; and
- the obstacle detection section determines that the obstacle actually exists when a number of successive times the first voltage level is determined to exceed the determination threshold is greater than or equal to a reference number of times, the obstacle detection system further comprising:
- a determination times setting section configured to set the reference number of times based on the second voltage level.

5. The obstacle detection system according to claim 4, wherein:
- the determination times setting section sets the reference number of times so that the reference number of times becomes larger the second voltage level becomes lager.

6. The obstacle detection system according to claim 4, wherein:
- the determination times setting section sets the reference number of times so that the reference number of times becomes a larger value as a ratio of the second voltage level to the determination threshold becomes smaller.

7. The obstacle detection system according to claim 1, further comprising:
- a timer portion configured to measure a period from a time when the ultrasonic wave transmission section transmits the ultrasonic wave toward the surroundings to a time when the ultrasonic wave reception section receives the ultrasonic wave reflected from the obstacle in the surroundings; and
- a distance calculation portion configured to calculate a distance to the obstacle based on the period and a speed of the ultrasonic wave when the obstacle detection section determines that the obstacle actually exists.

8. The obstacle detection system according to claim 1, wherein:
- the obstacle detection section cyclically performs the obstacle detection operation; and
- the obstacle detection section determines that the obstacle actually exists when a number of successive times the first voltage level is determined to exceed the determination threshold is greater than or equal to a reference number of times, the obstacle detection system further comprising:
- a determination times setting section configured to set the reference number of times based on the second voltage level.

\* \* \* \* \*